(No Model.)  2 Sheets—Sheet 1.

H. P. WOLF.
MEASURING MACHINE.

No. 564,132.  Patented July 14, 1896.

WITNESSES:  
Paul Johns

INVENTOR  
H. P. Wolf  
BY Munn & Co  
ATTORNEYS.

(No Model.) 2 Sheets—Sheet 2.
H. P. WOLF.
MEASURING MACHINE.
No. 564,132. Patented July 14, 1896.
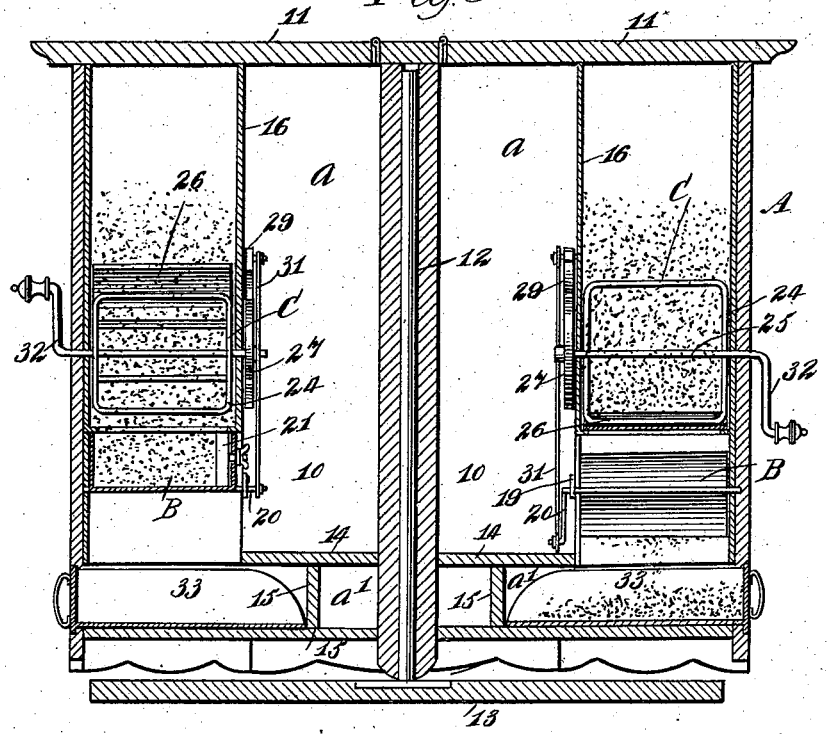
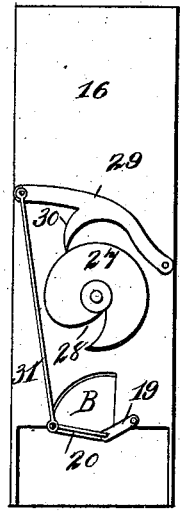 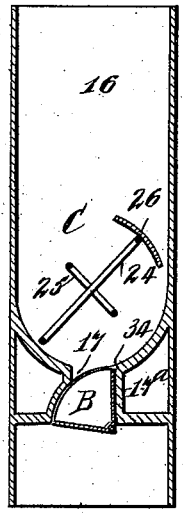 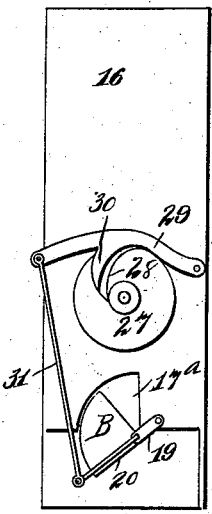 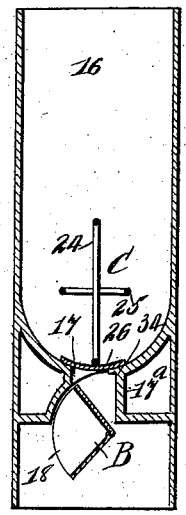
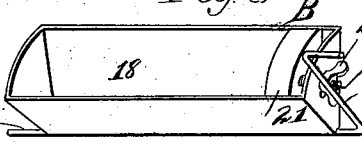
WITNESSES:
Paul Johot
Fred Acker
INVENTOR
H. P. Wolf
BY
Munn & Co
ATTORNEYS.

UNITED STATES PATENT OFFICE.

HERMANN P. WOLF, OF BURLINGTON, IOWA, ASSIGNOR OF ONE-HALF TO WILLIAM ROBERT WOLF, OF SAME PLACE.

MEASURING-MACHINE.

SPECIFICATION forming part of Letters Patent No. 564,132, dated July 14, 1896.

Application filed August 6, 1895. Serial No. 558,417. (No model.)

*To all whom it may concern:*

Be it known that I, HERMANN P. WOLF, of Burlington, in the county of Des Moines and State of Iowa, have invented a new and Improved Measuring-Machine, of which the following is a full, clear, and exact description.

My invention relates to an improvement in devices for weighing or measuring out a predetermined quantity of material, such as spices, powder, seeds, &c.; and its object is to provide a means whereby one or more of the devices capable of dispensing a predetermined amount of material, may be located in a cabinet of any approved construction, and whereby in the operation of the device the contents of the compartment in which it is placed will be agitated at each manipulation of the device, thus insuring the material being always in the condition to properly fill the measure; and a further object of the invention is to provide a means whereby the capacity of the measure may be regulated according to the material weighed, in order that a specified weight may be obtained without regard to the bulk of said material.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
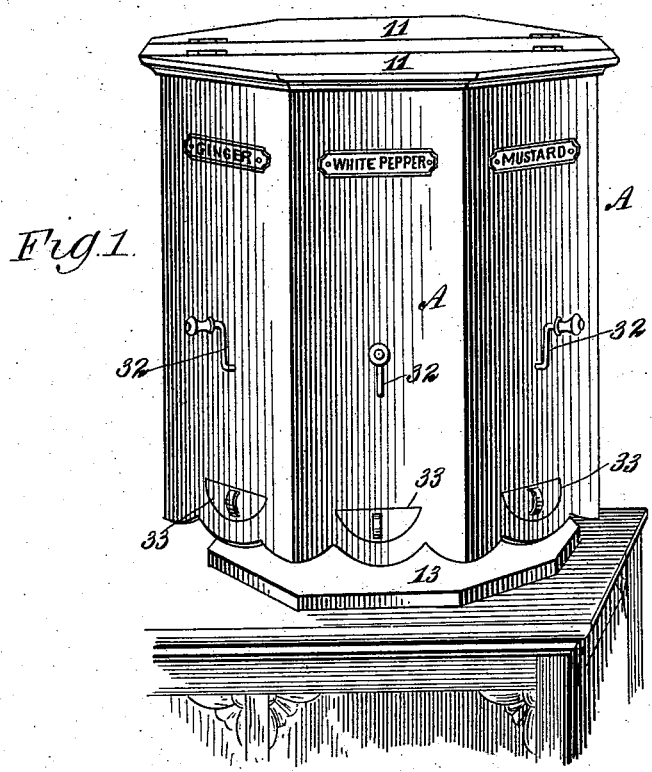
Figure 2:
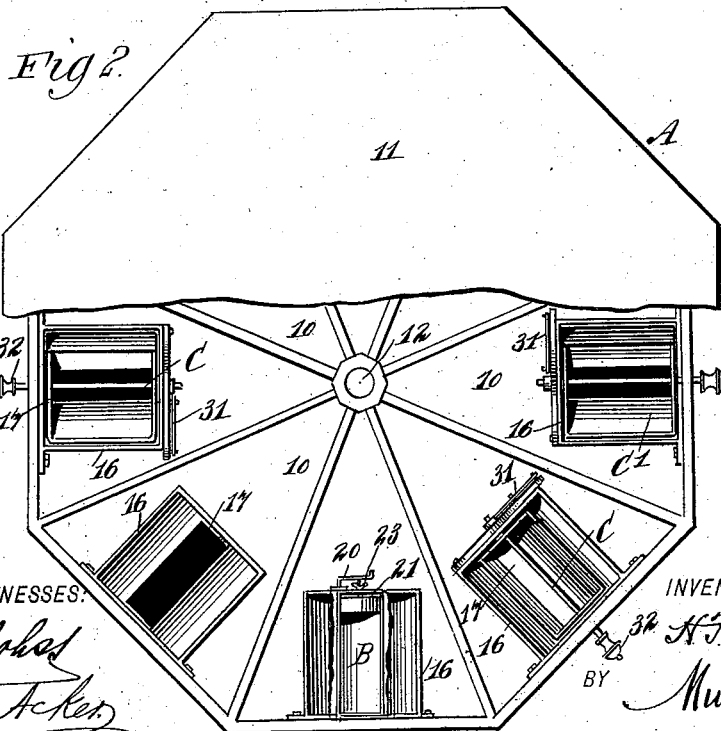

Figure 1 is a perspective view of the cabinet having the improved measuring device applied. Fig. 2 is a plan view of the cabinet, a portion of the top being broken away, illustrating the receptacles in the compartments in plan view. Fig. 3 is a vertical section through the entire machine. Fig. 4 is an inner side elevation of one of the receptacles, illustrating the measuring-trough in receiving position. Fig. 5 is a vertical section through the said receptacle, the trough being in the position shown in Fig. 4. Fig. 6 is an inner side elevation of a receptacle, the measuring-trough being shown in dumping position. Fig. 7 is a vertical section through the receptacle with the trough in the position shown in Fig. 6, and Fig. 8 is a perspective view of the trough.

In carrying out the invention the cabinet A may contain a single compartment, or a number of compartments, as illustrated, and the said cabinet may be made stationary, or may be made to revolve. The cabinet illustrated is of octagonal shape, being provided with eight separate compartments 10, radiating from the center, access being gained thereto by means of covers 11 at the top of the cabinet, and the cabinet is further shown as a rotary one, being mounted to turn upon a post 12 secured to a suitable base 13.

Each compartment 10 is divided into an upper and a lower subcompartment $a$ and $a'$ by means of a horizontal partition 14. The lower subcompartment $a'$ is converted substantially into a locker through the medium of a vertical partition 15 in its rear portion, as shown in Fig. 3. Each upper subcompartment $a$ contains a receptacle 16, and these receptacles are of any desired cross-sectional shape. Preferably, however, they are somewhat square or rectangular in cross-section, but their bottom portions are rounded off, presenting concaved inner faces at each side, and an opening 17 is made longitudinally in the bottom of each of the said receptacles, extending practically from side to side, and each opening is surrounded by a downwardly-extending neck $17^a$, which, in cross-section, is practically straight upon three sides and concaved on the fourth side, as shown in Figs. 5 and 7.

The neck of each receptacle is contained within the body of the receptacle, being located a predetermined distance from the bottom portion thereof, as is also shown in Figs. 4 and 7, and each neck $17^a$ is open at the inner side of the receptacle to which it appertains.

Immediately beneath each opening 17 in a receptacle a weighing device B is located. This weighing device consists of a trough 18, preferably triangular in cross-section, but the wider portion of its end surfaces is convexed and is presented to the concaved side of the throat beneath which the trough is located or pivoted. The trunnions of the trough are journaled one in the outer face of the receptacle and the other in a hanger 19, secured to the inner face of the receptacle, and the trunnion which passes through the said hanger 19 is provided with a crank-arm 20, as shown best in Fig. 8. The trough is of predetermined area, being capable, for example, of holding an ounce of spices, shot, or other equivalent material; but according to the bulk of the material the receiving area of the trough must be increased or decreased, and this is accomplished by placing a partition 21 in the trough at preferably its inner end, being adjustable to or from its opposite end by means of a screw 22 and lock-nut 23, or their equivalents, as shown likewise in Fig. 8.

Within each receptacle an agitator C is mounted to revolve. This agitator consists preferably of two loops 24 and 25 of stout wire, or like material, the said loops or links being substantially of rectangular shape. The loop 24 is much larger than the loop 25, and the larger loop is provided with a cut-off plate 26, secured to one side thereof, adapted when the trough is carried to a dumping position to close the opening in the receptacle in which the agitator is placed, leading into the neck 17$^a$. When, however, the trough is in receiving position, the link or loop 24 will be so located as to carry the cut-off from the outlet 17 of the receptacle, permitting the trough to fill.

A disk or wheel 27 is secured, preferably, to the inner trunnion of each of the agitators C, the wheel being outside of the receptacles 16; and this wheel is provided with a recess 28 in its periphery, and the recess is more or less of triangular shape. Above each wheel 27 a lever 29 is fulcrumed upon the inner face of the receptacles 16, and each lever is provided with a locking-arm 30, adapted to enter and snugly fit in the recess 28 in the disk or wheel 27; and the free end of each lever 29 is connected by a link 31 with the crank-arm 20 of the measuring-trough pertaining to the receptacle on which the lever is pivoted.

At the opposite end of each agitator a handle 32 is placed, preferably in the nature of a crank-arm, the handle being at the outside of the cabinet A; and in each lower compartment $a'$ of each main compartment 10, a scoop 33 is placed in such manner as to receive the material discharged by the measuring-troughs, the latter being above the scoops.

In operation when, for example, the handle of any one of the agitators is in the lower position shown in Fig. 3 at the right, the lever 29 will ride up upon the unbroken peripheral surface of the wheel or disk 27 belonging to the receptacle of that compartment; and the lever being held upward at its free end will draw the trough of that receptacle up within the neck 17$^a$, placing it in position to be filled, while the same movement of the handle thus placing the trough will have revolved the agitator and carried the cut-off from over the outlet 17. When a predetermined quantity of material is required from this receptacle, the handle is simply turned to the upper position shown at the left in Fig. 3, whereupon, as illustrated in Figs. 6 and 7, the lever 29 of that receptacle will drop by reason of its arm 30 entering the recess 28 in the wheel 27, and the dropping of the lever will release the trough to a predetermined extent, permitting it to dump, discharging its contents into the scoop 33 placed to receive it, while at the same time the agitator will have been turned to bring the cut-off 26 over the outlet of the receptacle, preventing the escape of any excess of material.

This device is exceedingly simple, durable, and economic, and various small articles may, through its instrumentality, be accurately, expeditiously, and conveniently weighed.

A lip 34 is provided at the top of the longitudinal straight wall of the neck 17$^a$, the said lip being adapted to extend over the side of the measuring-trough, engaging with said wall when the said trough is in receiving position, the object of the lip being to prevent the possibility of material entering between the trough and the aforesaid straight wall.

Having thus described my invention, I claim as new and desire to secure by Letters Patent—

1. The combination with a compartment having an outlet in its bottom, of a pivoted trough beneath the outlet, a pivoted lever, a connection between the lever and trough for operating the latter from the former, and a cam for operating said lever, substantially as described.

2. The combination, with a receptacle having an outlet in the bottom thereof, of a pivoted trough located beneath the said outlet, a lever provided with a locking-arm, located above the trough and connected therewith, and a rotating peripherally-recessed wheel controlling the movement of the said lever, as and for the purpose set forth.

3. A measuring device, the same comprising a receptacle provided with an outlet, a measuring-trough pivoted beneath the outlet, a casing partially surrounding the said trough, a lift-lever connected with said trough and operating it, and a cam for operating the said lever, as and for the purpose set forth.

4. In a measuring-machine, the combination with a receptacle having an outlet, of a pivoted trough beneath the outlet, an agitator in the receptacle, and means for operating the trough from the agitator, substantially as described.

5. In a measuring-machine, the combination with a receptacle having an outlet, of a pivoted measuring-trough beneath the outlet, an agitator in the receptacle, a cut-off carried by the agitator, and means for operating the trough from the agitator, substantially as described.

6. In a measuring-machine, a receptacle provided with an outlet surrounded by a neck, a trough pivoted within the said neck and capable of a dumping action, a lever fulcrumed on the receptacle, provided with a locking-arm, a connection between the lever and trough, an agitator located within the receptacle, a rotating keeper engaging with the said lever and operated from the said agitator, and a cut-off connected with the agitator, as and for the purpose specified.

HERMANN P. WOLF.

Witnesses:
THEO W. NIEMANN,
CHAS. HAFFNER.